United States Patent
Jagt et al.

(10) Patent No.: US 6,750,996 B2
(45) Date of Patent: Jun. 15, 2004

(54) WAVEGUIDE, EDGE-LIT ILLUMINATION ARRANGEMENT AND DISPLAY COMPRISING SUCH

(75) Inventors: Hendrik Johannes Boudewijn Jagt, Eindhoven (NL); Cees Bastiaansen, Montfort (NL); Hugo Johan Cornelissen, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/252,974

(22) Filed: Sep. 23, 2002

(65) Prior Publication Data

US 2003/0067760 A1 Apr. 10, 2003

(30) Foreign Application Priority Data

Sep. 26, 2001 (EP) .............................. 01203666

(51) Int. Cl.⁷ ................................................ G03H 1/00
(52) U.S. Cl. .............................. 359/34; 359/15; 362/31
(58) Field of Search ....................... 359/34, 15; 362/31; 349/62

(56) References Cited

U.S. PATENT DOCUMENTS

| | | | |
|---|---|---|---|
| 5,650,865 A | * 7/1997 | Smith | 359/15 |
| 5,726,723 A | * 3/1998 | Wang | 349/75 |
| 5,845,035 A | 12/1998 | Wimberger-Friedl | 385/129 |
| 6,048,071 A | 4/2000 | Sawayama | 362/31 |
| 2002/0140993 A1 | * 10/2002 | Silverbrook | 358/473 |
| 2003/0020975 A1 | * 1/2003 | Metz | 359/15 |

FOREIGN PATENT DOCUMENTS

| | | | |
|---|---|---|---|
| JP | A11232919 | 8/1999 | F21V/8/00 |
| JP | 11232919 | 8/1999 | F21V/8/00 |
| WO | WO9922268 | 5/1999 | G02F/1/1335 |

OTHER PUBLICATIONS

Fundamentals of Photonics, B.Saleh and M. Teich, Wiley, pp. 149–150.*

* cited by examiner

Primary Examiner—Drew A. Dunn
Assistant Examiner—Leo Boutsikaris

(57) ABSTRACT

A polarized light-emitting waveguide for use in an edge-lit lighting arrangement has polarization-selective outcoupling structure including at least a volume hologram for selectively diffracting waveguided light towards the exit surface of the waveguide with high contrast and efficiency. The light emitted by the waveguide is selectively emitted to one side thereof, highly polarized, highly collimated and may be homogeneously distributed across the exit surface. Also, light emission may be normal or near-normal to the exit surface. If combined with light recycling means the contrast, brightness and/or efficiency of the edge-lit illumination arrangement may be further increased.

29 Claims, 8 Drawing Sheets

WAVEGUIDE, EDGE-LIT ILLUMINATION ARRANGEMENT AND DISPLAY COMPRISING SUCH

The invention relates to a waveguide having an entry side face for coupling light into the waveguide and an exit surface for emission of waveguided light from the waveguide. The invention further relates to an edge-lit illumination arrangement comprising such a waveguide and a display device comprising such a waveguide or edge-lit illumination arrangement.

Waveguides of the type mentioned in the opening paragraph can be suitably used for supplying light from a light source arranged near an entry side face of the waveguide to a surface such as a display surface of, in particular, a non-emissive display device, such as a liquid crystal display (LCD), arranged near an exit surface of the waveguide. Typically, the exit surface extends parallel to the direction of waveguiding and is much larger in area than the entry side face. The light source being arranged on a side of the waveguide, a compact, in particular thin, lighting arrangement is obtained and display device comprising such can be obtained. Such an illumination arrangement is also referred to in the art as an edge-lit illumination arrangement.

In transmissive displays the light provided by the waveguide competes with ambient light to present the information displayed to the viewer and in this case the waveguide is typically used in a back light illumination arrangement in which case the display is arranged between the waveguide and a viewer. In a reflective display the waveguide may be used in a back or front light illumination arrangement. Since a reflective display makes use of ambient light to make the displayed information visible to the viewer, reflective displays are in particular preferred in low power applications such as hand held, palm top and other portable applications. A reflective display may be provided with an edge-lit illumination arrangement which need only be used if ambient lighting conditions are such to render the information presented by the display poorly visible using ambient light alone. Ambient light is understood to mean light provided by an external light source either natural or artificial.

In order to direct the light from the light source from an entry side face to an exit surface the waveguide comprises light outcoupling means. An example of such outcoupling means is a relief (micro)structured exit surface such as disclosed in patent application WO 99/22268. A disadvantage of such a relief structure is that the dimension of the relief structure elements is such that the relief structure as such is visible to a viewer, in particular when ambient light alone is sufficient to use the display. Using a volume hologram as the outcoupling does not have this disadvantage because the spatial modulation in refractive index recorded in the volume hologram has characteristic dimensions which cannot be resolved by the unaided eye.

A waveguide for use in a front illumination device having such a volume hologram is disclosed in U.S. Pat. No. 6,048,071. The front illumination device disclosed therein is mounted on the front surface of a reflective-type LCD. In order to provide polarized light to the LCD a polarizer is provided between the front illumination device and the LCD which absorbs one polarization of the ambient light or light from the front light. A similar front light arrangement is disclosed in JP-A-11-232919 and its English-language abstract.

It is an object of the invention, inter alia, to alleviate these drawbacks. In particular it is an object to provide a waveguide which can be suitably used in an edge-lit arrangement in particular one of the front light type and which, if used in such an edge-lit arrangement, provides an edge-lit arrangement which has a high brightness and/or makes highly efficient use of the light coupled at the entry side. Also, usage of the waveguide in accordance with the invention may result in an LCD of a simpler design by reducing the number of components thereof.

This object is achieved in accordance with the invention by a waveguide comprising an entry side face for coupling light into the waveguide, an exit surface for emission of light from the waveguide, and polarization-selective light outcoupling means for coupling out waveguided light through the exit surface polarization selectively, the polarization-selective outcoupling means comprising a volume hologram configured to selectively diffract waveguided light towards the exit surface.

The waveguide in accordance with the invention has polarization-selective outcoupling means which enables the waveguide to emit polarized light from its exit surface. If used in a back light illumination arrangement, this has the advantage that the polarizer for polarizing the light emitted by the waveguide can be dispensed with or can be made much thinner thus reducing the number of components and achieving further integration. Since polarizers contribute significantly to the total thickness of an LCD panel a significant reduction in thickness and weight is achieved. If used in a front light arrangement, wherein a polarizer is arranged between a viewer and the display cell, the polarized light emitting waveguide may be arranged between the polarizer and the display cell, in which case the polarizer helps to reduce the reflections coming off the front light when the display is lit by ambient light. Moreover, since the polarization-selective outcoupling means may be realized using non-absorptive means, ie diffractive, refractive, reflective and/or transmissive means which selectively couples out light of a first polarization while keeping the light of a second polarization captured in the waveguide, the waveguide in accordance with the invention is capable of making an edge-lit arrangement comprising such waveguide more efficient and/or more bright, if the waveguide comprises or is combined with means to at least partially convert the light having the second polarization into light having the first polarization and then offer the converted light again to polarization-selective outcoupling means. To some extent such recycling of waveguided light is inherent in any waveguide in accordance with the invention as imperfections, such as stress deformations which are generally inevitably always introduced to some extent during manufacture of the waveguide, cause the waveguide light to become depolarized as it traverses down the waveguide thus converting at least partially light of a second polarization to light of the first which converted is then offered to the polarization-selective outcoupling means further down the waveguide. Alternatively or additionally, other recycling means may be provided to increase the brightness and/or efficiency and/or polarization contrast of the light outcoupling of the waveguide.

The polarization-selective outcoupling means of the waveguide in accordance with the invention comprises a volume hologram configured to selectively diffract waveguided light towards the exit surface of the waveguide. The use of a hologram to couple out light from the waveguide has the advantage that, in contrast to micro relief patterned waveguides, it does not disturb the propagation of light incident on the volume hologram in transmission, an aspect which is of particular importance in front light applications. Furthermore, holograms allow good control over the angular distribution of the light coupled out in terms the principal direction(s) of outcoupling and/or the magnitude of the range of outcoupled angles. For example, the light coupled out can be made highly collimated or strongly diverging, and normal or near-normal outcoupling with respect to the exit surface may be achieved. Also, waveguided light can be coupled out selectively to a, typically one, side of the volume hologram (hereinafter also referred to as the front side) an aspect which is of particular relevance in front light arrangements as it allows selective direction of light to the display panel and away from the viewer.

Although any hologram configured to selectively diffract waveguided light towards the exit surface can be used in the polarization-selective outcoupling means, preferably use is made of a volume hologram which is characterized in that the recorded image three-dimensional rather than two-dimensional. More preferably, the hologram is a thick volume hologram as in a thick volume hologram diffraction is substantially limited to first order. A volume hologram is considered thick if it has a thickness which is significantly larger than the periodicity of the interference pattern recorded in the volume hologram. Typically, such thickness is 5 to 20 times larger than the periodicity of the holographic layer.

Generally, the volume holograms in the present invention are phase holograms, ie holograms in which the image is stored as a spatial modulation in refractive index. The volume hologram is manufactured in a conventional manner by exposing photosensitive holographic material to an interference pattern set up by light from an object (laser) light beam which interferes coherently with a reference (laser) light beam. The hologram thus recorded in the form of a spatial refractive index modulation may be reconstructed by means of a reading beam of waveguided light resulting in a diffractive emission from the waveguide.

In a preferred embodiment of the waveguide in accordance with the invention, the volume hologram is a volume holographic Bragg-grating.

A thick volume holographic phase grating has a refractive index modulation which is periodic in space. In its simplest form, a form referred to as an elementary hologram, the hologram may be thought of as stack of grating planes, the refractive index being constant within each grating plane and different between adjacent planes. Such an elementary hologram is characterized by stacking direction, a grating spacing and a slant or tilt angle. The stacking direction is the direction in which the grating planes are stacked, the grating spacing the periodicity of the refractive index modulation grating in the stacking direction and the slant or tilt angle, the angle between the normal of the grating planes and the stacking direction.

In order to be capable of diffracting waveguided light towards the exit surface, the stacking direction is selected parallel to a direction of waveguiding and the tilt angle is selected sufficiently large to selectively couple out diffracted light. More in particular, for light coupled out towards the exit surface, the following Bragg-condition (1) holds:

$$\sin(\theta''_B - \varphi) = \frac{\lambda_0}{2dn_{grating}} \text{ and } (\theta''_B - \varphi) = \theta_B = \theta_{i,grating} = \theta_{d,grating} \quad (1)$$

wherein, $\theta_{i,grating}$ is the angle of incidence of a waveguided light ray on the grating, $\theta_{d,grating}$ is the diffracted angle of the waveguided light ray, $\theta_B$ is the Bragg angle, all defined with respect to the grating plane, $\varphi$ is the tilt angle of the stack of grating planes and $\theta''_B$ the Bragg-angle, both defined with respect to the normal of the exit surface, $\lambda_o$ is the free space wavelength (wavelength in air) of the waveguided light, d is the grating spacing, and $n_{grating}$ is the average refractive index of the grating. According to second equation of formula (1), if the incident angle $\theta_{i,grating}$ corresponds to the Bragg angle the diffracted angle $\theta_{d,grating}$ equals the incident angle $\theta_{i,grating}$. The slant angle $\varphi$ and grating spacing d are selected such that the grating is configured to selectively diffract waveguided light of a predetermined wavelength and incident angle into a diffracted angle smaller than the critical angle $\theta_c$ for total internal reflection of the waveguide. When so selected, the condition $d=<\lambda_0/(2n_{grating} \sin(\theta_c-\varphi))$ is satisfied.

Waveguided light incident on the grating which does not satisfy the Bragg-condition is transmitted substantially unaltered by the hologram and therefore remains captured in the waveguide by TIR of the air/waveguide interface.

The hologram described above is referred to as an elementary hologram, ie a hologram which is characterized by a singular slant (tilt) angle and grating spacing which for each wavelength has one specific Bragg angle. Obviously, holograms of any desired complexity can be made by superposing elementary holograms to form composite holograms having a plurality of slant angles and grating spacings, which, obviously be manufactured in a single recording step by providing the appropriate recording step. Rather than recording such a composite hologram in a single holographic layer, the composite hologram may be formed as a stack of superposed elementary holograms or combinations thereof. Also, a plurality of holograms may be arranged adjacent to one another in a predetermined pattern.

The volume hologram may be used as an angle-selective outcoupling means By employing suitable volume holograms, the light emitted by the waveguide may be highly collimated in a narrow, typically as small as 20°, angular range and in a well-defined direction. In particular, the center of the angular range of light emission can be selected at any desired angle, in particular an angle (near-) normal to the exit surface which is of particular importance in back and front light applications. Use of the volume hologram as angle-selective outcoupling means is an aspect which may be considered an aspect independent of the polarization-selection aspect.

The volume hologram or a combination of such volume holograms may be used to obtain color selective or color separated outcoupling means. In its broadest sense, this aspect is not related to the polarization-selective outcoupling means. The angle at which light is diffracted by a volume hologram depends on the wavelength of the light so diffracted. Thus when white light is waveguided the colors are separated by diffraction angle. Spatial color separation into RGB pixels is achieved by coupling the diffracted light into a suitable microlens array which converts the angular range into a parallel spatially separated beams of different colors. The spatial color separation thus achieved may be highly efficient as, in contrast to conventional color filters, no light is absorbed in the process of generating spatial separated RGB pixels. Alternatively, the means for converting the angular color separation into a spatial separation spatially micro-lens function may be integrated in the holographic layer.

Alternatively, a hologram (a combination of different gratings) can be constructed which is configured to spatially-selectively couple out a specific RGB color. Such a configuration is achieved by providing holograms in accordance with a predetermined pattern, wherein each hologram couples out selectively light of a particular color, such as red green or blue. Such a configuration does not require the use of a micro-lens array and may even render the use of color filters superfluous.

The waveguide can take many forms. It may comprise a waveguide substrate on which a volume hologram is laminated as a separate layer or the volume hologram may be an integral part of the substrate. The volume hologram may be positioned on the side of the substrate facing or facing away from the display or even embedded within the waveguiding substrate. The waveguide may comprise two or more mutually separate holograms each laminated onto or formed integral with the waveguiding substrate. The waveguide may be provided at opposite sides of the waveguiding substrate or stacked on top of one another. The waveguide may have a single entry side face or more than one entry side face. If there is more than one the volume hologram is configured to diffract waveguided light coupled in via any of the entry faces.

The waveguide may be provided in the form of a plate such as a stack of foils or a pipe such as a fiber or a rod, the waveguide may be curved and/or flexible. In any case, if the waveguide is an assembly of optically different members, layers and the like, with interfaces being formed where a boundary surface of a first member meets that of a second member, it may be necessary to use an adhesive layer to connect the boundary surface of such a first and second member, in order to provide the waveguide with mechanical integrity and/or avoid the occurrence of spurious reflections and optical inhomogeneities resulting from, for example, air trapped in space formed at interfaces. Examples of such adhesive layers and the conditions and circumstances under which use of such an adhesive is appropriate are well known to those skilled in the art. Therefore, where in the context invention two separate optical members are put together to form interface it is understood that the interface may involve such an adhesive layer.

The volume hologram may be a transmission or a reflection-type hologram or a combination of both.

In order to emit polarized light the waveguide comprises polarization-selective outcoupling means. In the context of the invention, the light is selectively polarized if the emission of light having a first polarization is higher than the emission of light of a second polarization, that is the ratio of first to second, also referred to as polarization contrast is larger than one. The first polarization is orthogonal to the second polarization. The light having the first polarization may be linearly polarized, in particular s-polarized or p-polarized, or circularly polarized, in particular left-handed or right-handed polarized. A circular polarized light emitting waveguide in accordance with the invention can be conveniently obtained from a combination of a linear polarized light-emitting waveguide in accordance with the invention and quarter wave retarder, such a retarder being known per se. A circular polarized light emitting waveguide in accordance with the invention may be suitable combined with cholesteric texture liquid crystal cell, such a cell being known per se.

It is understood that if the light having the first polarization is s-polarized, light of the second is p-polarized and vice versa. Hereinbelow, a number of embodiments of polarization-selective outcoupling means are described which arrangements may, obviously, also be used in combination.

A first embodiment of the waveguide comprising such polarization-selective outcoupling means is a waveguide wherein the polarization selective outcoupling means include a volume hologram configured to diffract waveguided light at a Bragg-angle of about 45°.

According to Kogelnik in Bell System Technical Journal 1969, 48, 2909 the light diffracted at a Bragg-angle of 45° by a volume hologram configured to diffract light of a predetermined wavelength at a Bragg-angle of 45° is selectively s-polarized. Therefore, by providing a waveguide with a hologram which is configured to diffract waveguided light of a particular wavelength at a Bragg-angle of 45°, a polarization-selective light emitting waveguide is obtained. For example, an elementary volume hologram having grating planes which are tilted towards the entry face with a tilt angle of 45° is configured to diffract s-polarized waveguided light travelling in a direction substantially coincident with the principal direction of waveguiding to a near-normal direction to the exit surface. Preferably, the hologram is configured to have a 45° Bragg reflection for a range incident angles corresponding the range of angles of the waveguided light. Preferably, the volume hologram is configured to have a 45° Bragg reflection for a predetermined range of wavelengths, most preferably for many applications the visible range of the spectrum.

A second embodiment of the waveguide in accordance with the invention is a waveguide wherein the volume hologram comprises a volume holographic layer having a thickness d and a refractive index modulation $\Delta n$ the product $d\Delta n$ of which selected such that waveguided light of a first polarization is diffracted more efficiently than waveguided light of a second polarization, the diffraction efficiency of the first polarization being at least 5, preferably 10, times the diffraction efficiency of the second polarization.

The diffraction efficiency (hereinafter also D.E.) of a volume hologram is defined as the ratio of diffracted to light incident on the hologram. D.E. depends on the thickness of the grating and, moreover, the dependency of D.E. on thickness is different for s-polarized and p-polarized light. Hence, the volume hologram is rendered polarization selective by optimizing the thickness of the volume hologram such that light of a first polarization (eg s or p) is diffracted more efficiently than light of a second polarization (eg p or s). The selection of the optimum thickness d and refractive index modulation $\Delta n$ cannot be given in fixed numbers as it depends inter alia on the wavelength of the light one desires to diffract polarization-selectively. It further depends on the grating spacing and the slant angle of the volume hologram. The refractive index modulation may be varies by varying the photopolymer composition.

A third embodiment of the waveguide in accordance with the invention is a waveguide wherein the polarization-selective light outcoupling means comprises, disposed between the volume hologram and the entry side face, a polarization-selective beam splitting interface or layer for splitting waveguided light into light of a first polarization and light of a second polarization, at least the light of the first polarization being directed towards the volume hologram which is configured to selectively diffract the light of the first polarization.

Waveguides comprising polarization-selective beam splitting means are known per se. For example, U.S. Pat. No. 5,845,035 describes a waveguide comprising a polarization-selective beam splitting interface formed between an isotropic and anisotropic material of which one of the refractive indices is matched and another is mismatched with respect to the isotropic material. An example of a waveguide comprising polarization-selective beam splitting means comprising an anisotropically scattering layer is described the international application with application number EP01/05262.

The combination of polarization-selective beam splitting means and volume hologram results in a waveguide configured to emit polarized light of high brightness and contrast. In particular it allows highly collimated light emission along a normal or near-normal of the exit surface. Preferably, in order to further increase the brightness and/or efficiency of light of either polarization emitted by the waveguide, an end face opposite the entry side face is provided with reflecting means for reflecting waveguided light which is not coupled out when its traversed the waveguide. The contrast of polarized light outcoupling may be further increased by employing reflecting means which invert or depolarize the polarization of waveguided light incident on the end face, such means, such as a specular reflector provided with quarter wave plate, being known per se. Alternatively, the polarization contrast may be increased by providing the end face with light absorbing or anti-reflection means.

In a particular embodiment the waveguide comprises an entry member and an exit member, the entry member comprising the entry side face and the exit member comprising the volume hologram, the exit member and the entry member having a common interface forming the polarization-selective beam-splitting interface, and at least the entry or the exit member being optically anisotropic having refractive indices selected such that $$n_{entry,1}/n_{exit,1} < n_{entry,2}/n_{exit,2}$$

where $n_{entry,1}$ is a refractive index of the entry member experienced by waveguided light of a first polarization, $n_{entry,2}$ is a refractive index of the entry member experienced by waveguided light of a second polarization, $n_{exit,1}$ is a refractive index of the exit member experienced by waveguided light of a first polarization, $n_{exit,2}$ is a refractive index of the exit member experienced by waveguided light of a second polarization, light of the first polarization is refracted in angular range $\theta_{1,min} =< \theta_r < \theta_{1,max}$, and light of the second polarization is refracted in angular range $\theta_{2,min} < \theta_r =< \theta_{2,max}$, and wherein the volume hologram is configured to selectively diffract waveguided either light of the first polarization in the range $\theta_{1,min} =< \theta_r < \theta_{2,min}$ or light of the second polarization in the range $\theta_{1,max} < \theta_r =< \theta_{2,max}$.

Requiring the refractive indices of the exit member and exit member to satisfy the condition $n_{entry,1}/n_{exit,1} < n_{entry,2}/n_{exit,2}$ implies that at least the exit member or the entry member is optically anisotropic. If the condition is met, light of the first polarization incident on the common interface of the exit member and entry member is refracted more strongly than light of a second polarization. Thus, the common interface acts as a polarization-selective beam-splitting interface. More particularly, the difference in refraction results in an angular range comprising exclusively light of the first polarization and an angular range comprising exclusively light of the second polarization possibly separated by an angular range comprising light of both the first and second polarization. Since volume holograms can be configured to diffract specific incident angles within one of exclusive ranges with high selectivity, either the first polarization or the second polarization can be selectively coupled out.

The angular range of refracted angles $\theta_r$ in the exit member, $\theta_{1,min} =< \theta_r < \theta_{1,max}$, corresponds into a range of input angles incident on the interface from the entry member $\theta_{i,1} < \theta_i < \theta'_{i,1}$, where, using Snell's law, $n_{entry,1}*\sin\theta_{i,1} = n_{exit,1}*\sin\theta_{1,min}$ and $n_{entry,1}*\sin\theta'_{i,1} = n_{exit,1}*\sin\theta_{1,max}$, in which further $\theta_{c,1} =< \theta_{i,1}$ and $\theta'_{i,1} =< \theta'_{c,1}$ wherein $\theta_{c,1}$ is the critical angle of TIR for light of the first polarization reflected off the side of the entry member opposite the exit member, typically this is an air-entry member interface, and $\theta'_{c,1}$ is the critical angle of TIR for light of the first polarization reflected off the polarization-selective beam-splitting interface. Corresponding relationships apply to light of the second polarization. If $n_{entry,1}/n_{exit,1} < 1.0$, all input angles $\theta_i$ are refracted, and accordingly $\theta'_{c,1} = 90°$. Similarly, $\theta'_{c,2} = 90°$ if $n_{entry,2}/n_{exit,2} < 1.0$.

If the exit member is selected to be optically anisotropic, in order to maintain the difference in refraction between the first and the second polarization, the holographic layer should be anisotropic as well. A convenient way this condition may be satisfied is to use an anisotropic exit member in which the holographic forms an integral part. Preferably, the refractive index difference experienced by light which is not coupled out is chosen such that it remains trapped in the waveguide. Since the material opposite the hologram is normally air the condition for TIR is normally satisfied.

In order to maximize the range of refracted angles at which first polarized light is selectively refracted, the difference of $n_{exit,1}$ and $n_{exit,2}$ is to be maximized. Alternatively or in combination the difference of critical angles $\theta_{c1} - \theta_{c2}$ may be maximized which may be realized by using an anisotropic entry member. If reflections at the interface between the exit and entry member are to be minimized preferably, $n_{entry,2} = n_{exit,2}$ or $n_{entry,1} = n_{exit,1}$.

At least the exit or entry member, but preferably the exit member, is of optically anisotropic material. In a preferred arrangement the entry member is a relatively thick waveguide substrate laminated with a relatively thin layer of anisotropic material forming the exit member.

A fourth embodiment of the waveguide in accordance with the invention is a waveguide comprising an entry member and an exit member, the entry member comprising the entry side face and the exit member comprising the volume hologram, the exit member and the entry member having a common interface forming the polarization-selective beam-splitting interface, and at least the entry or the exit member being optically anisotropic having refractive indices selected such that waveguided light of a first polarization incident from the entry member on the interface is at least partially transmitted into the exit member and waveguided light of a second polarization incident from the entry member on the interface is, at least partially, totally internally reflected, and the volume hologram is configured for diffracting the waveguided light transmitted into the exit member.

In order to have waveguided light of the first polarization, at least partially, transmitted (refracted) the interface should not waveguide light of the first polarization which is attained if $n_{entry,1}/n_{exit,1} < 1.0$, whereas if the waveguide is to, at least partially, totally internally reflect light of the second polarization $n_{entry,2}/n_{exit,2} > 1.0$, where $n_{entry,1}$, $n_{exit,1}$, $n_{entry,2}$ and $n_{exit,2}$ are defined as hereinabove.

In order to minimize reflection of the interface of waveguided light having the first polarization, the difference $n_{exit,1} - n_{entry,1}$ is to be as small as possible, preferable $n_{exit,1}$ is substantially matched to $n_{entry,1}$.

A fifth embodiment of the waveguide in accordance with the invention is a waveguide wherein the polarization selective outcoupling means include a volume hologram formed from an optically anisotropic material having a first refractive index modulation experienced by light of a first polarization and a second refractive index modulation experienced by light of a second polarization, the first and the second refractive index modulation being different.

In this fifth embodiment, the volume hologram may be recorded in a photo-sensitive optically anisotropic material having a polarization-dependent refractive index modulation, where refractive index modulation is defined as the difference in refractive index in adjacent regions of high and low refractive index of the volume hologram. The Diffraction Efficiency (D.E.) of a volume holographic grating is a function of the refractive index modulation achieved. Hence, by adjusting the refractive index modulation, a maximum Diffraction Efficiency (D.E.) may be achieved for a specific grating thickness. If the holographic layer is anisotropic said refractive index modulation is different in different directions in the volume hologram. Hence, the refractive index modulation and therefore the D.E. is polarization dependent.

As an example, consider a holographic image recorded by polymerizing a photo-polymerizable composition comprising an anisotropic LC and an isotropic non-LC monomer). If the refractive index of the isotropic non-LC, for example, nearly equals the ordinary refractive index of the LC material, p-polarized light will encounter only a small refractive index modulation and, in general, be coupled out with a low D.E. The extraordinary refractive index of the LC material will differ much more from the isotropic non-LC refractive index, resulting, in general, in a much higher D.E. Thus, the resulting outcoupled light will be polarized. Ideally, the refractive index of the non-LC material substantially matches the ordinary refractive index of the LC-material reducing the D.E. for p-polarized to 0, thus maximizing the contrast of polarized light emission.

In a further embodiment a waveguide in accordance with the invention comprises a combination of a volume hologram and an exit member integrally formed from optically anisotropic material and/or a combination of a volume hologram and a polarization-selective beam splitting layer integrally formed from optically anisotropic material.

Generally, each interface between optically different materials will introduce reflections and refractions due to that interface, which may lead to stray light. In order to reduce stray light it is advantageous to minimize the number of interfaces of the waveguide which is achieved by integrating the volume hologram with the exit member, the volume hologram being present in the half of the exit member comprising the exit surface.

As discussed above, the waveguide comprises polarization-selective outcoupling means in which, generally, polarization selection is achieved using non-absorptive, that is refracting and/or reflecting and/or diffracting means which allows the waveguide to be configured for recycling the light, in particular light of the second polarization, which is initially not coupled out. To this end, the waveguide may comprise light recycling means which depolarize or revert the polarization of waveguided light processed by the recycling means thus improving the efficiency and/or brightness and/or polarization contrast of the waveguide.

To a certain extent, such recycling means are inherently present in any waveguide in accordance with the invention because any member or substrate through which waveguiding occurs has optical imperfections introduced during the manufacturing process, an important example being stress-induced variations in refractive index, which have the effect of depolarizing light incident on these imperfections.

Several other recycling means are available for converting light of the polarization trapped in the waveguide into light of the first polarization emitted by the waveguide, such as providing the waveguide with an optical retardation layer, providing the waveguide with a diffusing layer capable of depolarizing trapped waveguided light, providing the end face opposite the entry face or the side opposite the exit face with a depolarizing (e.g. diffusing) reflector, or polarization-inverting reflector such as a reflector consisting of a layer with a quarter-wave function ($\lambda/4$) and a specularly reflecting layer.

Materials suitable for use in the waveguide are generally transparent to the light emitted by the waveguide. Isotropic materials may be glass, transparent ceramics or polymeric materials such as polyacrylates, polyepoxides, polycarbonates and the like.

In its broadest sense, the choice of optically anisotropic material is not critical. For example, such material may be inorganic but preferably is organic. Polymeric materials or liquid crystalline materials, in particular polymeric liquid crystal materials are preferred. Of specific use are polymerized oriented liquid crystal monomer compositions, in particular LC side-chain, main-chain or network polymers. Suitable LC phases include cholesteric, (chiral) nematic, or smectic, discotic. Also, birefringent material and uniaxially or biaxially oriented materials such as stretch oriented polymers such as polyethylene naphthalate (PEN) or polyethylene terephthalate (PET) or nematic liquid crystal materials may be suitably used. Non-photopolymeric materials, such material being known per se may also used.

A uniaxially oriented material has an ordinary refractive index $n_o$ along two axes and an extraordinary refractive index $n_e$ along the axis perpendicular to said two axis, in which $n_e > n_o$ (for example stretched polymers and nematic LCs) or $n_e < n_o$ (discotic materials). If used in the waveguide the anisotropic material is to be arranged such that waveguided light of the first polarization experiences the ordinary refractive index and light of the second the extraordinary refractive index or vice versa.

Further examples of suitable anisotropic materials as well as isotropic materials are disclosed in U.S. Pat. No. 5,845, 035 and the references cited therein relating thereto.

In another aspect, in fact an aspect which may find broader and independent application than polarized light emitting waveguides alone, the invention relates to a waveguide having a homogeneous light emission along the exit surface and illumination systems and displays comprising such. Homogeneity may relate to the homogeneity of direction of outcoupling or the homogeneity in the intensity of outcoupled light along the exit surface.

With respect to the direction of light outcoupling, conventional waveguides which do not have holograms to couple out light suffer from an inhomogeneous outcoupling direction along the exit surface, which is due to the limited and inhomogeneous angular selectivity of the outcoupling means. The waveguide comprising the volume hologram however, may be highly angular selective, and hence are less sensitive to preferential depletion of specific outcoupled waveguided angles. This results in a homogeneous light outcoupling direction along the exit surface.

With respect to the homogeneity in intensity along the exit surface, volume holographic phase gratings diffract specific waveguide angles with high selectivity and therefore waveguided light having the corresponding incident angle is selectively depleted as the waveguided light moves away from the entry surface. If no measures are taken to correct for the depletion, the brightness of the exit surface will become less the further away from the entry side face. The depletion may be corrected for and thus a more homogeneous emission achieved by providing a volume hologram which has holographic areas and non-holographic areas laid out in a pattern where the fraction of the total area covered by holographic areas at a particular position along the waveguide increases as the distance from the entry surface increases, where the extent of increase is matched to the extent of depletion.

Alternatively, the volume hologram may be provided with a refractive index modulation such that the incident angle which the volume hologram is capable of diffracting at a particular position is varied as a function of the position along the waveguide.

Another option is to provide diffracted angle replenishing means which replenish the depleted angles by redistributing the angles of undiffracted light which is trapped in the waveguide to angles that can be coupled out through diffraction. Examples of such means a wedge-shaped entry member or waveguiding substrate, a faceted mirror attached to the waveguide, a non-specular reflector provided on an end face of the waveguide opposite the entry face comprising a slightly scattering volume or surface scattering layer or a light scattering exit surface or any other surface which serves a surface for waveguiding light provided with a light scattering relief structure or light scattering layer.

A further advantage of a waveguide comprising a volume hologram, which in the broadest sense need not be combined with or comprises polarization-selective outcoupling means, and which is of eminent importance with respect to waveguides for use in front light arrangements, is that the light may be coupled out selectively to one side of the hologram, this side being referred to as the front side.

Therefore in another aspect, the invention relates to a waveguide comprising an entry side face for coupling light into the waveguide, an exit surface for emission of light from the waveguide, a back surface opposite the exit surface, and a volume hologram configured to selectively couple out light to one side of the waveguide, the one side being the exit surface side of the waveguide.

The side (surface) opposite the front side (surface) is referred to as the rear or back side (surface). The volume hologram selectively diffracts light to the front side (the forward direction) instead of the back side (the backward direction). The extent to which this occurs may be expressed by the forward-to-backward contrast. The waveguide in accordance with this aspect of the invention typically has at least a contrast of 10 at an angle of emission, or better, at least 15 or 25. More in particular, the contrast may be at least 10 averaged over all angles at which light is emitted.

In a reflective display provided with a front light, light coupled out from the rear side reaches the viewer directly without passing through the display cell and such backward coupled out light does not carry any display image information. Thus, any increase in contrast of the light emitted from the front side compared to the rear side directly translates into a corresponding increase in contrast of a reflective display comprising such hologram.

In order to further increase the contrast relating to selective outcoupling to one side of the waveguide, in a preferred embodiment, the waveguide has an end face opposite the entry side face which end face is provided with means for reducing the amount of light reflected back into the waveguide, such as an anti-reflecting layer or stack of layers or a light-absorbing coating.

Such means help increase the contrast because the side-selective outcoupling depends on the direction from which waveguided light is incident on the hologram. In general, if waveguided light coming from the direction of the entry side is diffracted by the hologram to the front side then light coming from the opposite, that is light reflected by the corresponding end face, is diffracted to the rear side. Preventing such light to reach the hologram increases the contrast of side-selective emission.

The invention also relates to an edge-lit illumination arrangement comprising a waveguide in accordance with the invention and a light source arranged near the entry side face thereof.

The light source may be any kind of lamp, in particular an elongated lamp such as a fluorescent tube or a light emitting diode. The arrangement may contain further means to enhance the efficiency and collimation of light incoupling. The system may be a back light or a front light arrangement. Since the volume hologram, unlike other outcoupling means, transmits ambient light incident at angles smaller than the critical angle substantially undisturbed and is configured for diffracting waveguided light selectively to one side of the waveguide, the invention is of particular use for front light arrangements.

The invention further relates to a reflective or transflective display device, such as a liquid crystal device, having a front light arrangement comprising an illumination arrangement in accordance with the invention.

The illumination arrangement in accordance with the invention may be suitably used to illuminate any kind of object. However, preferably the object is a display device. If used in a back light arrangement the object or display is illuminated in transmission, the viewer being on the opposite side of the object or display. If used in a front light arrangement the object is illuminated in reflection, the front light and viewer being on the same side of the illuminated object. In a front light arrangement the display device to be illuminated is to be of capable of operating in reflection, ie the display is to be of the reflective or transflective type. If the waveguide is capable of emitting polarized light, the display device may be a display device which for its capability to display information relies on polarized light, one important class of such displays being liquid crystal displays.

In a preferred embodiment the invention relates to a reflective display device in accordance with the invention, comprising a display cell and polarizer arranged on a viewing side of the display cell wherein the front light arrangement is disposed between the polarizer and the display cell.

Having a front light which emits polarized light allows the polarizer can be arranged on the viewing side of the front light instead of on the display side of the front light as is conventional for front lights emitting unpolarized light. Such an arrangement reduces the reflections from the front light by ambient light.

The waveguide in accordance with the invention and illumination arrangement comprising such waveguides make efficient use of light from the light source arranged near the entry side face to illuminate the display and consequently allow low power light sources to be used. Since the light source is responsible for a large part of the energy consumption of the display device, the display is particularly advantageous for laptop, palm top, handheld or other portable products in particular a mobile phone.

Therefore, in a preferred embodiment, the invention relates to a mobile phone provided with an illumination arrangement in accordance with the invention or a display device in accordance with the invention.

These and other aspects will be apparent from and elucidated with reference to the embodiments described hereinafter.

In the drawings;

FIG. 1 shows schematically in a cross-sectional view, a waveguide and front illumination arrangement and display device in accordance with the invention, FIG. 2 shows, schematically, in operation, an apparatus for recording volume holograms, FIG. 3 shows the normalized spectrum, relative intensity I (in dimensionless units) vs wavelength λ (in nm), emitted by a CCFL lamp, FIG. 4 shows the luminance L (in $cd/m^2$) as a function of the inclination angle α (in degrees) of light emitted by a waveguide in accordance with the invention edge-lit by a CCFL lamp having the emission spectrum as shown in FIG. 3 for s-polarized (curve S) and p-polarized light (curve P) respectively, FIG. 5 shows the polarization contrast $C_{pol}$ (in dimensionless units) as a function of inclination angle α (in degrees) corresponding to the luminance data plotted in FIG. 4, FIG. 6 shows the relative intensity I (in dimensionless units) as a function of wavelength λ (in nm) for various inclination angles of a waveguide in accordance with the invention, FIG. 7 shows the normalized emission spectrum, relative intensity I (in dimensionless units) vs wavelength λ (in nm), of a green light emitting diode, FIG. 8 shows the luminance L (in arbitrary units) as a function of the inclination angle α (in degrees) of light emitted by a waveguide in accordance with the invention edge-lit by a light emitting diode having the emission spectrum shown in FIG. 7 for s-polarized (curve S) and p-polarized light (curve P) respectively, FIG. 9 shows the polarization contrast $C_{pol}$ (in dimensionless units) as a function of the inclination angle α (in degrees) corresponding to the luminance data plotted in FIG. 8, FIG. 10 shows the s-polarized luminance L (in arbitrary units) as a function of the inclination angle α (in degrees) of light emitted by a waveguide in accordance with the invention edge-lit by a light emitting diode having the emission shown in FIG. 7 in a forward (curve F) and a backward direction (curve B), FIG. 11 shows the forward-to-backward contrast $C_{F/B}$ (in dimensionless units) as a function of the inclination angle α (in degrees) of the s-polarized luminance data shown in FIG. 10, FIG. 12 shows a calculated graph of the diffraction efficiency D.E. (in dimensionless units) as a function of the grating thickness d (in μm) of s-polarized light emitted by a volume holographic grating layer for different values of Δn, FIG. 13 shows a calculated graph of the diffraction efficiency D.E. (in dimensionless units) as a function of the grating thickness d (in μm) of p-polarized light emitted by a volume holographic grating layer for different values of Δn, FIG. 14 shows, schematically, a further embodiment of an illumination arrangement and waveguide in accordance with the invention, FIG. 15 shows, schematically, the behavior of light in the illumination arrangement shown in FIG. 14, FIG. 16 shows, schematically, the behavior of light in another embodiment of an illumination arrangement and waveguide in accordance with the invention, FIG. 17 shows schematically in a cross-sectional view, yet another waveguide and front illumination arrangement and display device in accordance with the invention, and FIG. 18 shows, schematically, in a cross-sectional view, a waveguide and back light illumination arrangement and display device in accordance with the invention.

FIG. 1 shows schematically a reflective display device 1 having a display cell 3 of transparent substrates 5 between which a liquid crystal layer 7 is disposed. The cell 3 is configured to comprise a plurality of independently addressable pixels 9. A reflector 11 is positioned opposite the viewing side (indicated by viewer 2) and provided with an absorbing linear polarizer 13 for absorbing light of the first and transmitting light of a second polarization. Between the viewer 2 and the display cell 3 a second absorbing linear polarizer 15 is disposed which is crossed with the polarizer 13, for transmitting light of the first and absorbing light of the second polarization. The display device 1 further comprises a front light arrangement 17 arranged between the polarizer 15 and the display cell 3. The front light 17 being arranged on the display side of the polarizer 15, instead of the viewing side as is conventional, reduces reflections off the front light 17 when the display 1 is used with ambient light. The edge-lit front light arrangement 17 has a light source 19 which is arranged near the entry side face 23 of a waveguide 21. The waveguide 21 has an exit surface 25 for emission of light from the waveguide 21 coupled in at the entry side face 23. The waveguide has polarization-selective light outcoupling means 27 in the form of a volume hologram capable of selectively diffracting waveguided light towards the exit surface 25. Optionally, at a side opposite the entry side 23 the waveguide 21 is provided with a light absorbing means, depolarizing reflecting means, anti-reflection means or polarization-inverting reflecting means 29 for recycling or absorbing the light which reaches that side without being coupled out.

In operation, tracing an unpolarized ambient light ray r1u incident on the display 1 at a pixel 9 which is not addressed (pixel "off"), the ray r1u is polarized by the analyzing polar 15 to form an s-polarized light ray r1s. The volume hologram is configured to diffract selectively waveguided light and to transmit light incident at non-waveguiding angles, the light ray r1s is transmitted undisturbed by the volume hologram.

The spatial modulation of the refractive index recorded in the volume hologram is of the order of the wavelength of visible light and therefore cannot be resolved by the viewer 2. Thus, the hologram 27 itself is not visible and does not obstruct the perception of the image presented by the display cell 3.

In this embodiment, the display cell 3 is configured to rotate the polarization of light transmitted by it by 90° when a pixel 9 is not addressed, thus changing the s-polarized light ray r1s into p-polarized light ray r1p. The polarizer 13, being in a crossed arrangement with the polarizer 15, transmits the light ray r1p which is then reflected while preserving its polarization by reflector 11 to form light ray r1p'. Light ray r1p' is transformed to r1s' by the cell 3 and transmitted by the polarizer 15 to reach the viewer 2. So, in a non-addressed state the pixel 9 appears white. On the other hand, if a pixel 9 is addressed, ambient s-polarized light ray r2s is transmitted unaffected by the display cell 3 and thus absorbed in the polarizer 13, the pixel 9 then appearing dark to the viewer 2. If ambient lighting conditions are poor the light source 19 may be switched on. Light emitted by the light source 19, typically unpolarized, such as light ray r3u is coupled in at the entry side face 23 and waveguided along the waveguide 21. When incident on the polarization-selective outcoupling means, volume hologram 27, s-polarized light is selectively diffracted into light r3s and p-polarized light ray r3p is transmitted and travels further down the waveguide 21 by TIR. As it travels down the waveguide 21, due to eg stress deformations introduced during manufacture of the waveguide, the ray r3p may depolarize into a ray r3u' which comprises to some extent s-polarized light. The s-polarized light obtained by depolarization may again be incident on and selectively diffracted by the volume hologram 27 as ray r3s'. Thus, light recycling is obtained rendering the waveguide 21 a highly efficient and/or bright source of polarized light. Eventually, p-polarized light ray r3p' may reach the end face opposite the entry face 23 and may be reflected, absorbed or leave the waveguide at that end face. Diffracted light ray r3s is incident on a non-addressed pixel and thus eventually emitted by the display 1. Similarly diffracted light r4s incident on an addressed pixel 9, is absorbed by the polarizer 13.

Light which reaches the end of the waveguide without being diffracted and is reflected back into the waveguide may be diffracted by the hologram. It is inherent feature of the volume hologram that the light so diffracted is diffracted to the back side of the front light 17 and thus directly to the viewer 2. Thus, the front-to-back side emission contrast is reduced. Accordingly, by providing a light-absorbing layer 29 at the end face opposite the entry face 23 which prevents the light reaching the end of the waveguide 17 form being reflecting back into the waveguide the front-to-back side emission contrast is increased. Alternatively, if the waveguide 21 is provided with polarization conversion means 29 for converting p-polarized into s-polarized light, by depolarization or polarization inversion, light recycling is obtained. Since the s-polarized light may be coupled out by the volume hologram on its way back itno waveguide 21, the efficiency of emission of s-polarized light of the front light arrangement 17 can be significantly increased, thereby increasing brightness and/or reducing power consumption. Such polarization conversion means are known in the art per se, an example being a polarization-conserving reflector provided with a quarter wavelength retarder.

FIG. 2 shows, schematically, in operation, an apparatus 101 for recording volume holograms, in particular an apparatus for recording a volume hologram capable of selectively diffracting waveguided light. More particular, the apparatus 101 is for recording a hologram in waveguiding mode.

The apparatus 101 comprises an Argon-Ion Continuous Wave (CW) laser 103 (Spectra-Physics Beamlock 2085-25S) operated at a UV-laser line with a wavelength of 351.1 nm. An etalon was used in the laser cavity to obtain single frequency operation. In operation, the laser 103 produces a $TEM_{00}$ mode laser beam of a first polarization having a Gaussian intensity profile across the beam, the diameter of the beam being 1.6 mm at $1/e^2$ of the maximum central intensity level. A half wave retarder 104 is used to depolarize the laser beam into a beam which has a predetermined ratio of first and second polarization. By rotating the retarder 104 the intensity of the reference beam RB relative to the object beam OB can be controlled in particular to obtain an equal intensity per unit area in the region of overlap of the reference beam RB and object beam OB at the face 111 of cube 109. To enlarge the diameter to about 22 mm and spatially filter the laser beam a lens system 105 is provided comprising a pinhole 105p having a diameter of 5 µm, a plano-convex fused silica lens 105L1 (diameter D=6.35 mm, focal length f=12.7 mm) and a plano-convex fused silica lens 105L2 (D=25 mm, f=50 mm).

The apparatus 101 comprises a Mach-Zehnder type interferometer module comprising a polarizing beam splitter PBS (25.4 mm, fused silica) and two UV-mirrors (D=50 mm) $M_1$ and $M_2$. Between mirror $M_1$ and the splitter PBS a half-wave retarder 107 is positioned for changing the polarization state of the light outputted by the PBS. In operation, the laser light beam entering the interferometer is split by the splitter PBS in an reference beam RB having a first polarization and a object beam OB having a second polarization, the polarization of the object beam OB then being converted to the first polarization direction by the retarder 107. By reflecting off the mirrors $M_1$ and $M_2$ an interference pattern is set up in the region of overlap of the object beam OB and reference beam RB. The combined power of both beams was approximately 0.5 mW/mm².

The apparatus 101 further comprises a sample holder in the form of a (50*50*50 mm) glass cube 109 of which the face 111 is equipped to receive samples comprising holographic material. The glass cube 109 and mirrors are set such that the normal of the face 111 and object beam OB make an angle $\alpha e1$ and the face 111 and the reference beam RB make an angle $\alpha e2$.

By way of example, the apparatus 101 is now used to manufacture a waveguide in accordance with the invention, specifically a waveguide comprising polarization selective outcoupling means including a volume holographic Bragg-grating configured to diffract at Bragg-angles of about 45°, in particular for a predetermined range of wavelengths, preferably the visible range of wavelengths.

First, a sample 113 is formed by sandwiching a holographic photopolymer mixture of 49.5 wt % poly(styrene) (PS), $M_w$=45.000 g/mole, 49.5 wt % cyclohexyl methacrylate (CHMA) and 1 wt % 1-hydroxycyclohexylphenylketone (UV-initiator), all purchased from Aldrich, between a glass substrate 117, 76*26 mm in area and 1 mm thick and a glass slide 119, 50*24 mm in area and 150 µm thickness, to form a holographic layer 115 of 100 µm thickness.

Alternatively, a mixture of 49.4 wt % polystyrene (PS), 49.6 wt % diethyleneglycol-dimethacrylate (DEGDMA), and 0.98 wt % UV-initiator 1-hydroxycyclohexylphenylketone may be used. The sample 113 thus obtained is adhered on its glass slide side to the face 111 of the cube 109 using refractive index contact fluid (eg benzylmethacrylate, n=1.510).

Second, the angles $\alpha e1$ and $\alpha e2$ are then selected such that when the reference beam RB is incident on the air-glass interface of the glass substrate 117 of the sample 113 total internal reflection occurs at that interface. More specifically, the angles are to be selected such that a 45° Bragg angle is achieved for green light (550 nm) at a diffraction angle of −10° in air. Calculations show that, given the wavelength of the laser light used to record the hologram, the grating spacing of the hologram must then be 250.9 mm and its tilt angle 38.6°, which according to further calculations, translates into angles $\alpha e1$ and $\alpha e2$ of 18.4° and 32.8° respectively.

Third, with the angles $\alpha e1$ and $\alpha e2$ thus set, a volume hologram is recorded in the holographic layer 115 by illuminating the sample with the reference beam RB and the object beam OB for 60 s, with the ratio of object beam intensity to reference beam intensity selected such that the amount of light incident on the holographic layer 115 per unit area, at the region of overlap, the object and reference beam contribute equally, and then curing the layer 115 further by a uniform blanket exposure with UV light for 30 min.

After curing, the sample 113 forms a waveguide 21 (FIG. 1) comprising an entry side face for coupling light into the waveguide, an exit surface for emission of light from the waveguide, and polarization-selective light outcoupling means for coupling out waveguided light through the exit surface polarization selectively, the polarization-selective outcoupling means comprising a volume hologram in the form of a volume holographic Bragg-grating configured to selectively diffract waveguided light for a predetermined range of wavelengths at Bragg-angles of about 45°.

The sample 115 (waveguide 21) is removed from the glass cube 109 and a cold cathode fluorescent lamp (CCFL) is arranged near the entrance side 23 thereof thus forming an edge-lit illumination arrangement 17.

FIG. 3 shows the normalized emission spectrum of the CCFL lamp. The edge-lit illumination arrangement 17 is mounted on a luminance measurement apparatus, an EZ Contrast 300D manufactured by Eldim for measuring light output as a function output angle.

The luminance (in $cd/m^2$) as a function of the inclination angle (in degrees) of light emitted by the waveguide 21 edge-lit by a CCFL lamp having the emission spectrum as shown in FIG. 3 for s-polarized (curve S) and p-polarized light (curve P) respectively, is then measured and the results shown in FIG. 4. The luminance is measured in a plane perpendicular to the grating planes.

FIG. 5 shows the polarization contrast (in dimensionless units) corresponding to the luminance data plotted in FIG. 4.

The inclination angle is defined as the angle between the normal of the holographic layer 115 and the direction in which the luminance is measured.

Firstly, FIGS. 4 and 5 demonstrate that the light coupled out by the waveguide in accordance with the invention is highly polarized. The polarization contrast is at least 5 across the distribution of inclination angles at which significant light emission takes place (−25 to +10°), and for specific inclination angles the polarization contrast is higher than 10 or 15. For light coupled out at around −10° the inclination for the hologram was specifically designed the polarization contrast exceeds 75.

Secondly, the light coupled out by the waveguide in accordance with the invention is highly collimated, most light being coupled in the range −25 to +10°.

Thirdly, the light outcoupling of the waveguide is color selective, the emission peaks of the CCFL lamp, labeled R for red, Y for yellow, G for green and B for blue, being clearly discernable in FIG. 4.

Additionally, the inclination angles at which light is coupled out are near the normal of the exit surface. In the present example, the light outcoupling is deliberately selected to be centered around an inclination angle of −10°. By appropriately adapting the recording process any inclination angle, in particular 0°, can be realized.

FIG. 6 shows the relative intensity (in dimensionless units) as a function of wavelength (in nm) for various inclination angles of the waveguide 21 in accordance with the invention having the emission spectrum of FIG. 4. FIG. 6 confirms the color selective light emission of the waveguide with red (appr. 611 nm) selectively coupled at −20°, yellow (appr. 585 nm) at −14°, green (appr. 545 nm) at −8° and greenish-blue (appr. 490 nm) at 0°. Additionally, deep red (appr. 650 nm) at −27° and blue (appr. 435 nm) at 8° are coupled out but these are, due to the low luminance hardly discernible in FIG. 4. Note, that in contrast to FIG. 4 where the luminance, a photometric quantity, is plotted, the relative intensity plotted in FIG. 6 is a radiometric quantity corresponding to the emitted energy rather than the eye-sensitivity which results in a, with respect to FIG. 4, completely different intensity balance between the different colours, the blue and red contributions being much more significant in FIG. 6.

In a second example of an embodiment of an edge-lit illumination arrangement in accordance with the invention, the CCFL lamp is replaced by a green light emitting diode, the normalized emission spectrum of which is shown in FIG. 7.

Angular luminance measurements as described above are performed on the edge-lit illumination arrangement thus obtained.

Referring to FIGS. 8 and 9, the light outcoupled by the waveguide is highly collimated within 20° angular range centered around −11° and highly polarized, the polarization contrast exceeding 200 at inclination angle −11°, whereas throughout the −6° to −12° range the polarization contrast exceeds 100. The very high polarization contrasts achieved in this second embodiment seem due to the fact that the polarization contrast of the waveguide is highest in the wavelength range 555–575 nm. In this wavelength the LED has a high emission intensity whereas the CCFL has low intensity.

Figure 1:
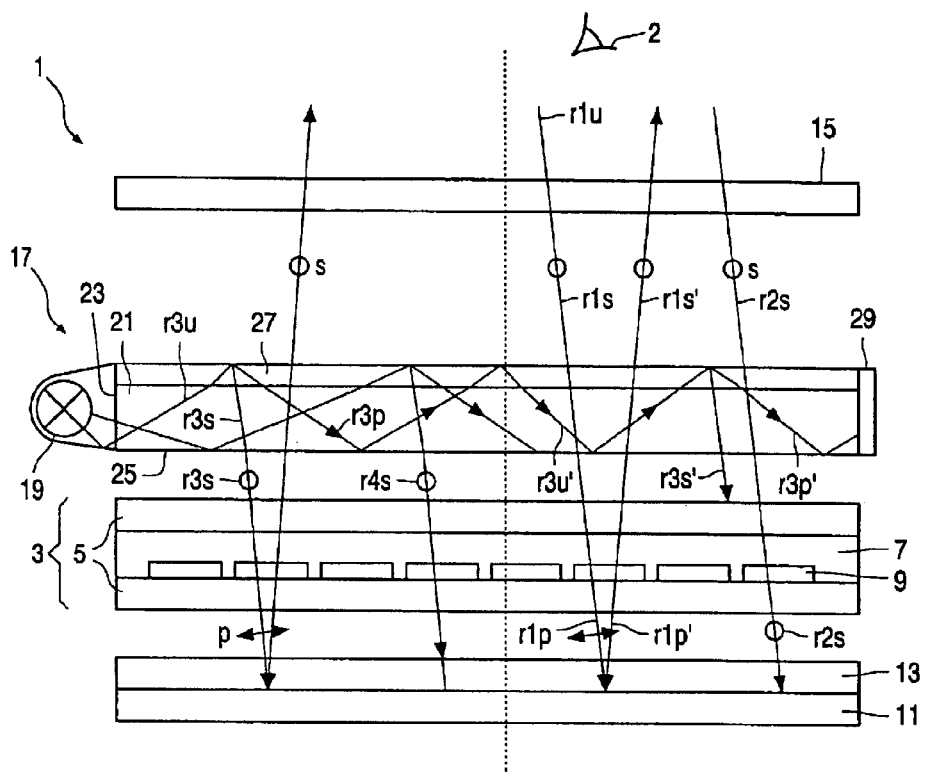
Figure 2:
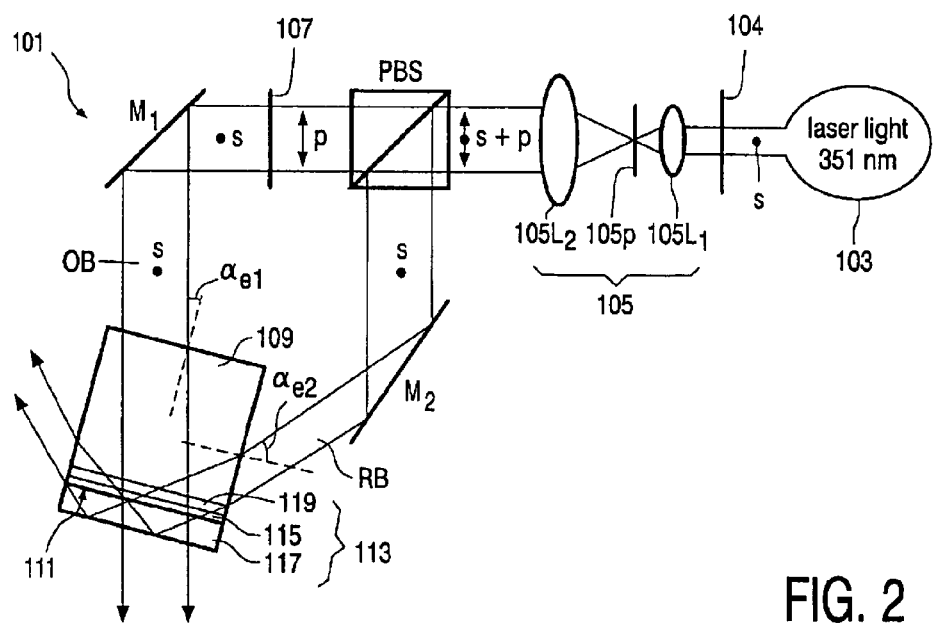
Figure 3:
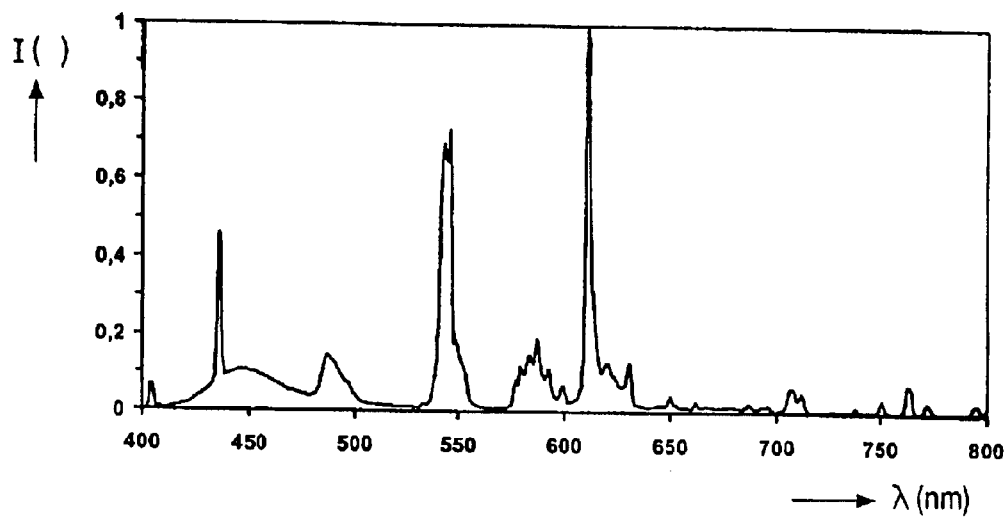
Figure 6:
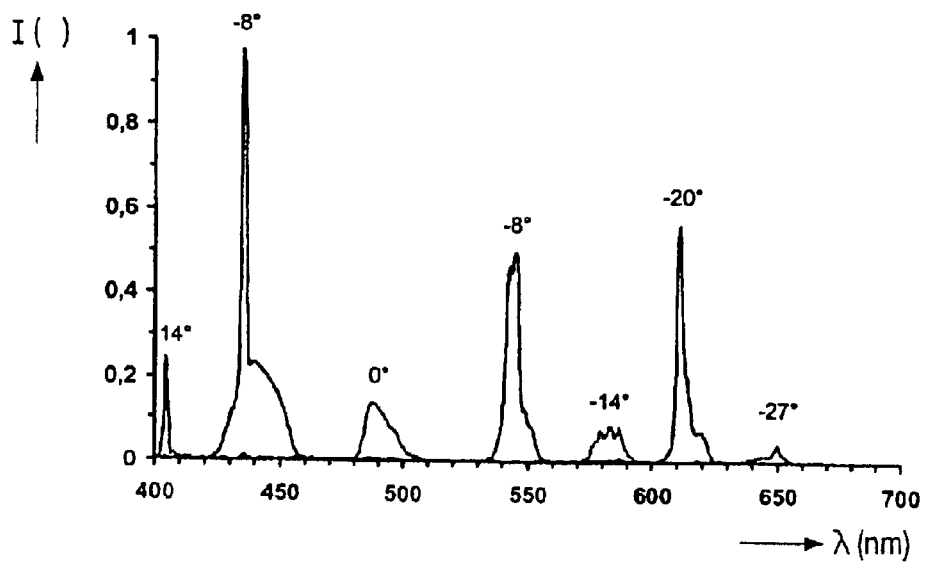
Figure 4:
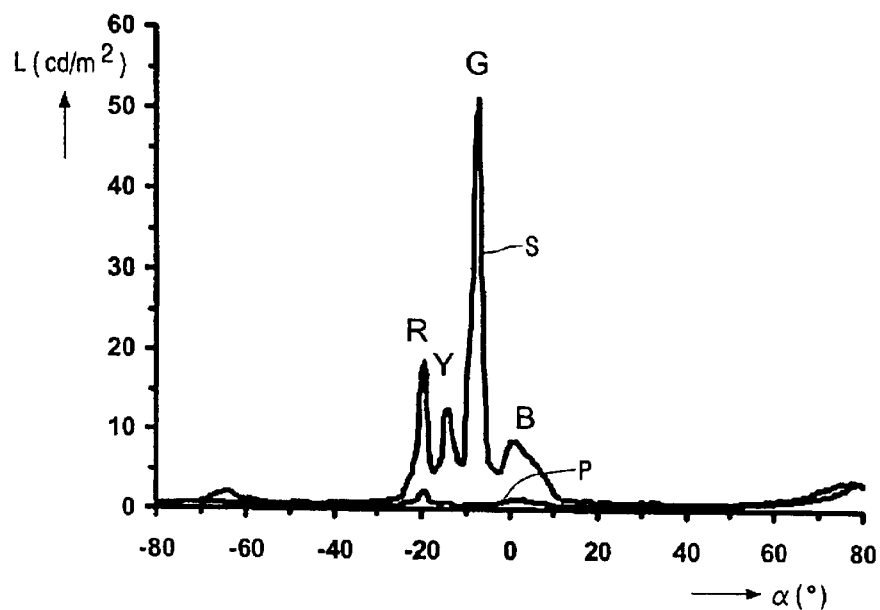
Figure 5:
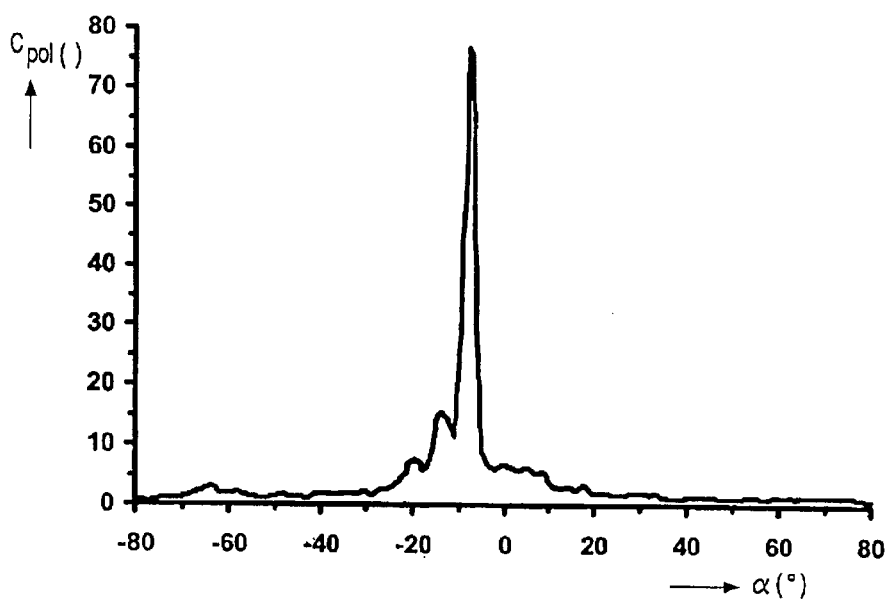
Figure 7:
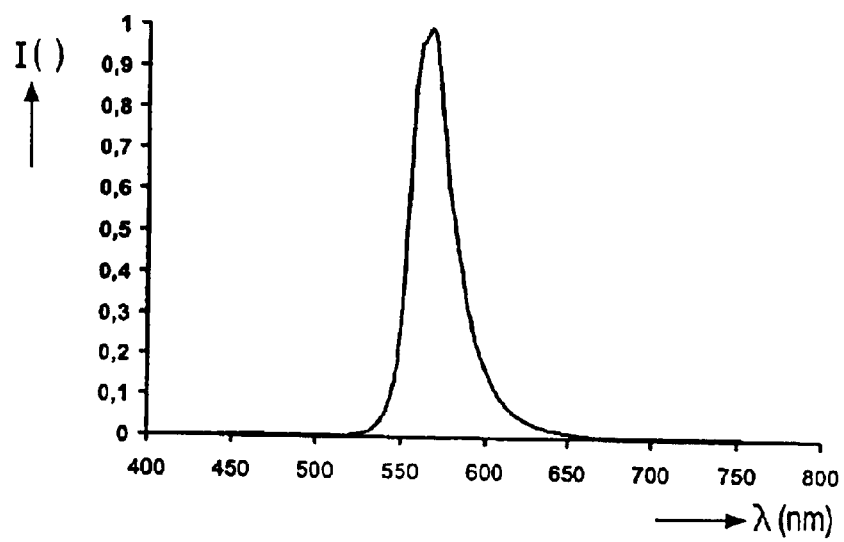
Figure 8:
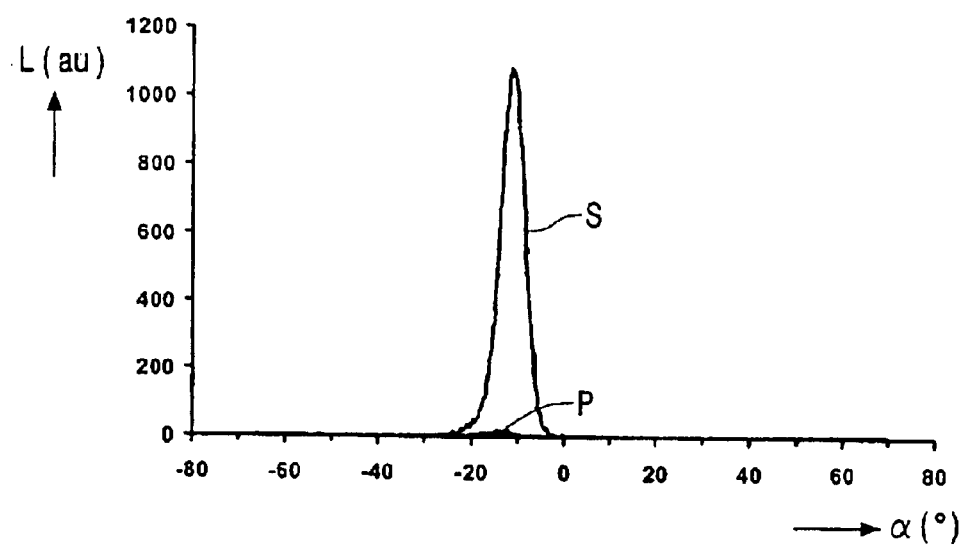
Figure 9:
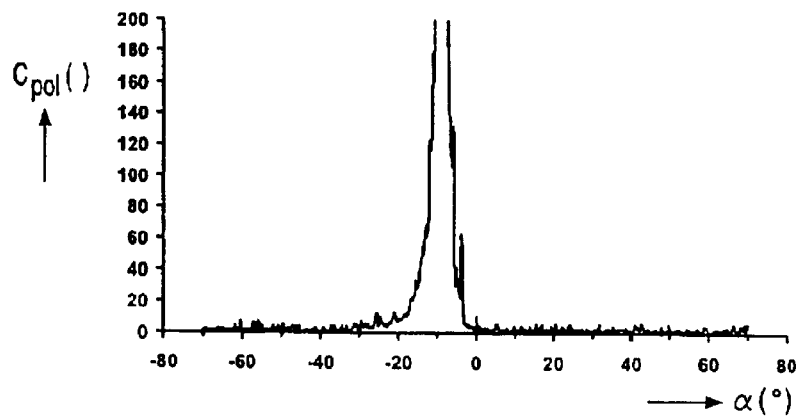
Figure 10:
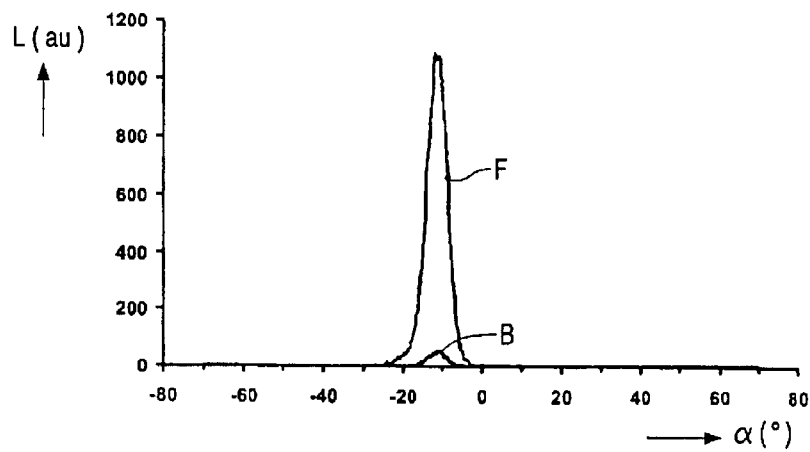
FIG. 10 shows the s-polarised luminance (in arbitrary units) of light emitted by the second embodiment of the edge-lit illumination arrangement in accordance with the invention, edge-lit by a light emitting diode having the emission shown in FIG. 7, in a forward (curve F) and a backward direction (curve B).
Figure 11:
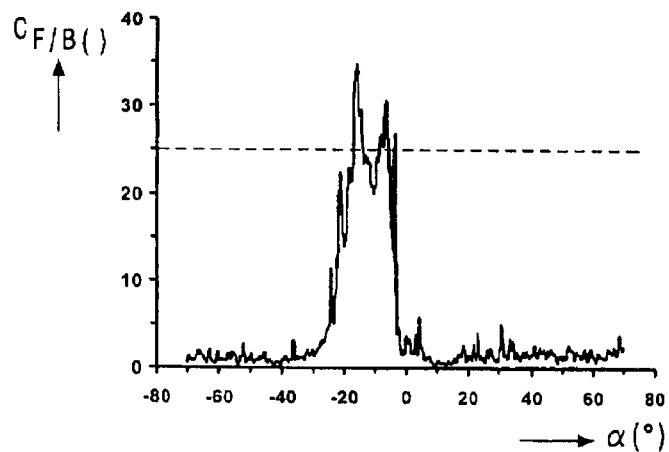
FIG. 11 shows the forward-to-backward contrast of the s-polarized luminance data shown in FIG. 10.

An important aspect of the waveguide and edge-lit illumination arrangement in accordance with the invention is that the light coupled out by the waveguide is coupled out selectively to one side of the waveguide, conveniently referred to as the front side. This aspect is particularly advantageous if the edge-lit arrangement is used as a front light. If used as a front light in a display, the illumination arrangement is with its front side directed to the display and its back side to the viewer. Any light emitted from the back-side is directly emitted to a viewer. The contrast of the display is proportional to the forward-to-backward contrast. Referring to FIGS. 10 and 11, the waveguide in accordance with this embodiment of the invention couples out light highly selectively to one side, the front side. The forward-to-backward contrast is about 25 which indicates that the contrast is in fact limited by the 4% reflection typically observed for reflection at an air glass interface at (near) normal angles, here being the interface of air and the glass surface of the substrate facing away from the volume hologram. If desired, the 4% reflection may be further reduced by providing an anti-reflection coating. In this embodiment the waveguide is, on an end face opposite the entry side face provided with a light absorbing coating for absorbing any waveguided light which has reached that end face. Any light reflected of such an end face would be selectively coupled out to the back side thus reducing the contrast. Without such light absorbing layer present the forward-to-backward contrast is still quite high, typically 10 or higher.

In another embodiment of the invention, the volume hologram comprises a volume holographic layer having a thickness d and refractive index modulation $\Delta n$ the product $d\Delta n$ of which selected such that waveguided light of a first polarization is diffracted more efficiently than waveguided light of a second polarization, the diffraction efficiency of the first polarization being at least 5, preferably 10, times the diffraction efficiency of the second polarization.

Figure 12:
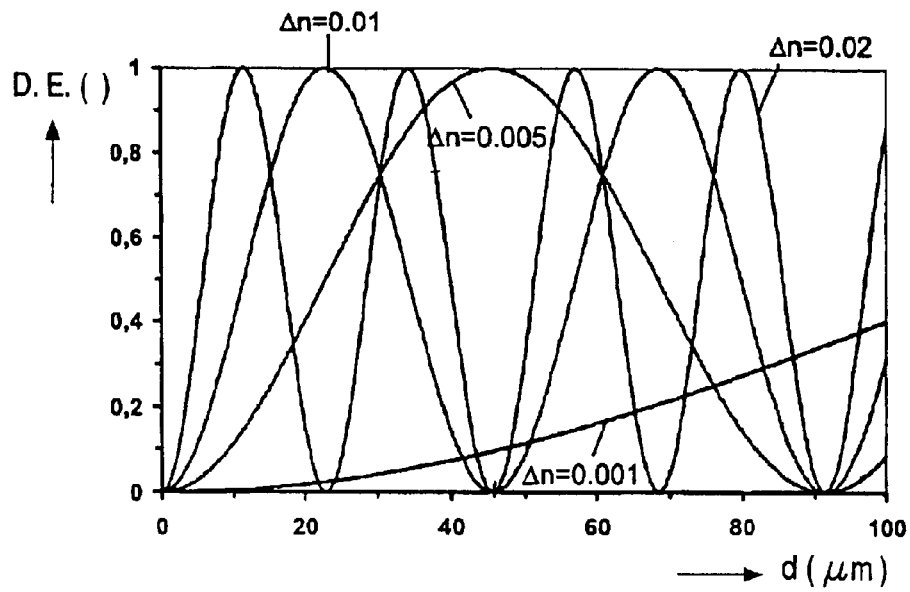

FIG. 12 shows a calculated graph of the diffraction efficiency (in dimensionless units) of s-polarized light emitted by a volume holographic grating layer as a function of the grating thickness (in $\mu m$) for different values of $\Delta n$.

Figure 13:
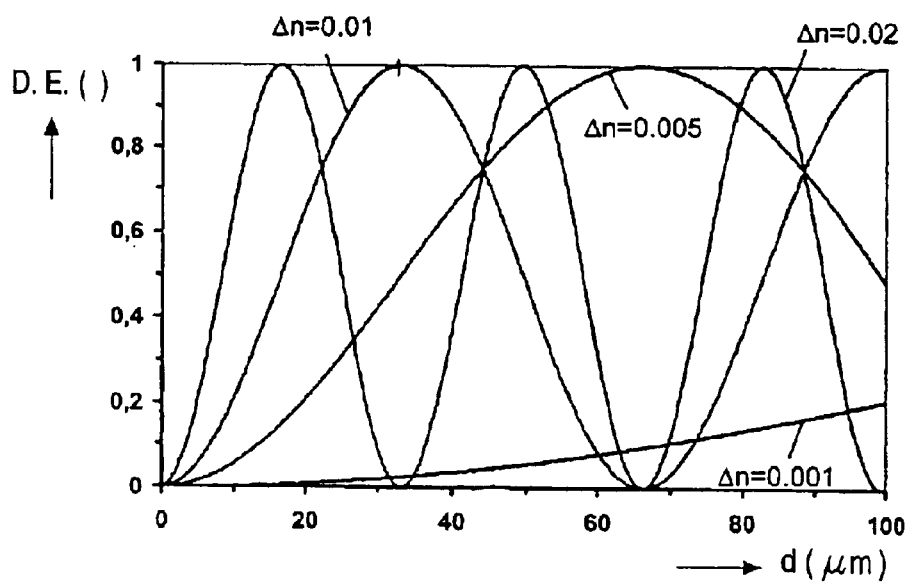

FIG. 13 shows a calculated graph of the diffraction efficiency (in dimensionless units) of p-polarized light emitted by a volume holographic grating layer as a function of the grating thickness (in µm) for different values of Δn.

The results plotted are based on a holographic grating which has a grating spacing of 450 nm, a slant or tilt angle of 23.2°, and an average refractive index of 1.55 and illuminated with light of 550 nm (in air).

Diffraction efficiency DE is defined as the ratio $I_d/(I_r+I_d)$ where $I_d$ is the intensity of the 1$^{st}$ order diffracted beam and $I_r$ is the intensity of the undisturbed part of the reference beam (0$^{th}$ diffraction order).

FIGS. 12 and 13 are calculated under the assumption of exact Bragg-matching by means of the formulas given in Kogelnik in Bell System Technical Journal 1969, 48, 2909 which relate the product dΔn to the parameters of slant angle, grating spacing and wavelength to be diffracted at Bragg-condition is exactly met.

FIGS. 12 and 13 demonstrate that if an appropriate selection of the grating layer thickness and refractive index modulation Δn is made, polarized light outcoupling can be achieved. For example, if the refractive index modulation Δn=0.01, a grating thickness of 45 µm results in p-polarized light being coupled out polarization-selectively with high contrast. The same contrast is achieved if Δn=0.005 and the thickness is 90 µm indicating that the product dΔn is the relevant parameter.

If Δn=0.01 and the thickness 65 µm s-polarized light is coupled out highly selectively.

Preferably, the polarization contrast is selected as large as possible, such as 20, 100 or higher.

A polarization contrast of less than 5 is unsuitably low for many practical applications such as a front light arrangement.

Figure 14:
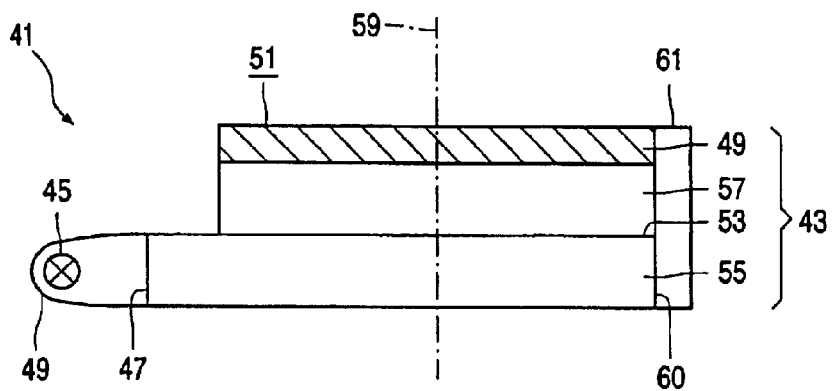

FIG. 14 shows, schematically, a further embodiment of an illumination arrangement and waveguide in accordance with the invention.

Figure 15:
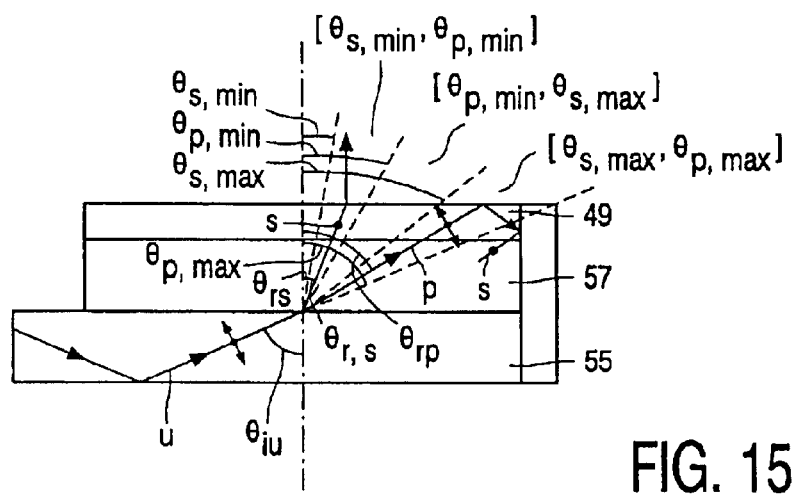

FIG. 15 shows, schematically, the behavior of light in the illumination arrangement shown in FIG. 14.

The edge-lit illumination arrangement 41 comprises a waveguide 43 having an entry side face 47 near to which a light source 45 with reflector 49 is arranged, an exit surface 51. The waveguide 43 comprises polarization-sensitive outcoupling means for coupling out waveguided light polarization-selectively comprising a volume hologram 49 and, situated between the entry face 47 and the volume hologram 49, a polarization-selective beam splitting interface 53 corresponding to the interface of an entry member 55, also referred to as the waveguiding substrate, and an exit member 57. The entry and exit members have refractive indices satisfying $n_{entry,1}/n_{exit,1}<n_{entry,2}/n_{exit,2}$ implying that at least the entry member or the exit member is optically anisotropic and making the common interface 53 a polarization-selective beam-splitting interface, where $n_{entry,1}$ is a refractive index of the entry member 55 experienced by waveguided light of a first polarization, $n_{entry,2}$ is a refractive index of the entry member 55 experienced by waveguided light of a second polarization, $n_{exit,1}$ is a refractive index of the exit member 57 experienced by waveguided light of a first polarization, $n_{exit,2}$ is a refractive index of the exit member 57 experienced by waveguided light of a second polarization.

Referring, to FIG. 15, in which light of the first polarization is represented by s-polarized light and light of the second by p-polarized light, the beam-splitting interface 53 refracts s-polarized light in a refracted angular range $\theta_{s,min}<\theta_r<\theta_{s,max}$ and p-polarized light in a refracted angular range $\theta_{p,min}<\theta_r<\theta_{p,max}$. Since $\theta_{p,min}<\theta_{s,max}$ the two ranges overlap to form a range $\theta_{s,min}<\theta_r<\theta_{p,min}$ exclusively consisting of s-polarized light, a range $\theta_{s,max}<\theta_r<\theta_{p,max}$ exclusively consisting of p-polarized light and an intermediate range $\theta_{p,min}<\theta_r<\theta_{s,max}$ comprising both s and p-polarized light.

The volume hologram 49 is configured to selectively diffract waveguided light refracted into the exit member 57 having a refracted angle in the range $\theta_{s,min}<\theta_r<\theta_{p,min}$ and thus only s-polarized is coupled out. Instead, it could have been the range $\theta_{s,max}<\theta_r=<\theta_{p,max}$ to couple out p-polarized light.

Optionally, the waveguide further comprises, provided on an end face 60 opposite the entry side face 47 a polarization inverting or depolarizing reflector 61 for inverting or depolarizing the polarization of any waveguided light which is not coupled out via the exit surface 51 upon reflection.

In this particular embodiment, $n_{entry,1}/n_{exit,1}<1.0$, and the entry member 55 is optically isotropic whereas the exit member 57 is optically anisotropic, which implies that $n_{entry,1}=n_{entry,2}=n_s$ and $\theta_{c1}=\theta_{c2}=\theta_c$. Angles are measured with respect to an axis 59 normal to the exit surface 51.

Referring to FIG. 15, in operation, a typical unpolarized light ray u is coupled in at the entry side face 47, waveguided down the waveguide 43, and incident on the polarization-selective beam splitting interface 53 with angle of incidence $\theta_{iu}$, where $\theta_c<\theta_{iu}=<90°$. Since $n_{entry,1}/n_{exit,1}<1.0$, the first component of the unpolarized ray u, say the s-polarized component, is refracted by the interface 53 and enters the exit member 57 with an angle of refraction $\theta_{rs}$ whereas a second component of the light ray u, the p-polarized component, is refracted into the exit member 57 with an angle $\theta_{rp}$. The volume hologram selectively couples out the ray s refracted with angle $\theta_{rs}$ and transmits the ray p with angle $\theta_{rp}$, the ray p then being totally internally reflected of the exit surface 51. Thus, the polarization-sensitive beam splitting interface 53 and the volume hologram cooperate to form polarization-sensitive outcoupling means for coupling out waveguided light polarization-selectively. In order to further improve the brightness and/or efficiency of polarized light output of the illumination arrangement the totally internally reflected p-polarized light ray p may be depolarized or polarization-inverted to produce an s-polarized light ray s upon reflection of the polarization inversion reflector 49 thus making the thus obtained s-polarized light ray available for outcoupling as it travels down the waveguide 43 towards the entry side face 47.

Figure 16:
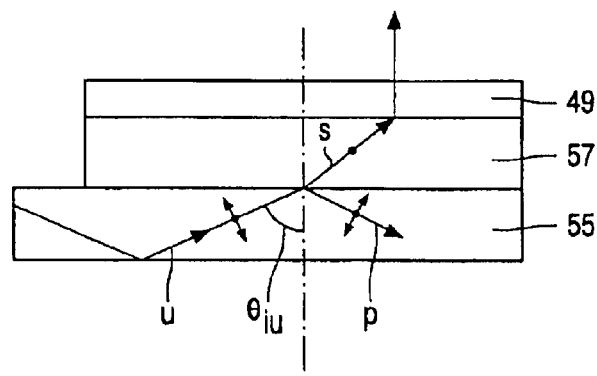

FIG. 16 shows, schematically, the behavior of light in another embodiment of an illumination arrangement and waveguide in accordance with the invention. The embodiment to which FIG. 16 refers is identical to the embodiment shown in FIG. 14 with the exception that the optical indicatrix of the entry and exit member are mutually attuned such that $n_{entry,1}/n_{exit,1}=<1.0$ and $n_{entry,2}/n_{exit,2}>1.0$. With the optical indicatrix mutually so attuned, waveguided light of the first polarization incident from the entry member on the interface is at least partially transmitted (refracted) into the exit member and waveguided light of a second polarization incident from the entry member on the interface is totally internally reflected at least for angles larger than the corresponding critical angle of the polarization-selective beam-splitting interface and the waveguided light of the first polarization is, provided the volume hologram is configured for diffracting the waveguided light transmitted into the exit member, selectively coupled out by the volume hologram. To suppress TIR at the interface between the volume hologram and the exit member of the polarization to be coupled out, preferably, the average refractive index of the volume holographic layer should be equal to or higher than $n_{entry,1}$.

In other words, if unpolarized waveguided light ray u is incident on the polarization-selective beam splitting interface it is split into a refracted light ray s of a first polarization, say s-polarized, and a totally internally reflected light ray p of the second polarization, say p-polarized, the s-polarized light ray s is coupled out by the hologram. The volume hologram and polarization-selective beam-splitting interface cooperate to form a waveguide comprising polarization-selective outcoupling means in accordance with the invention.

Figure 17:
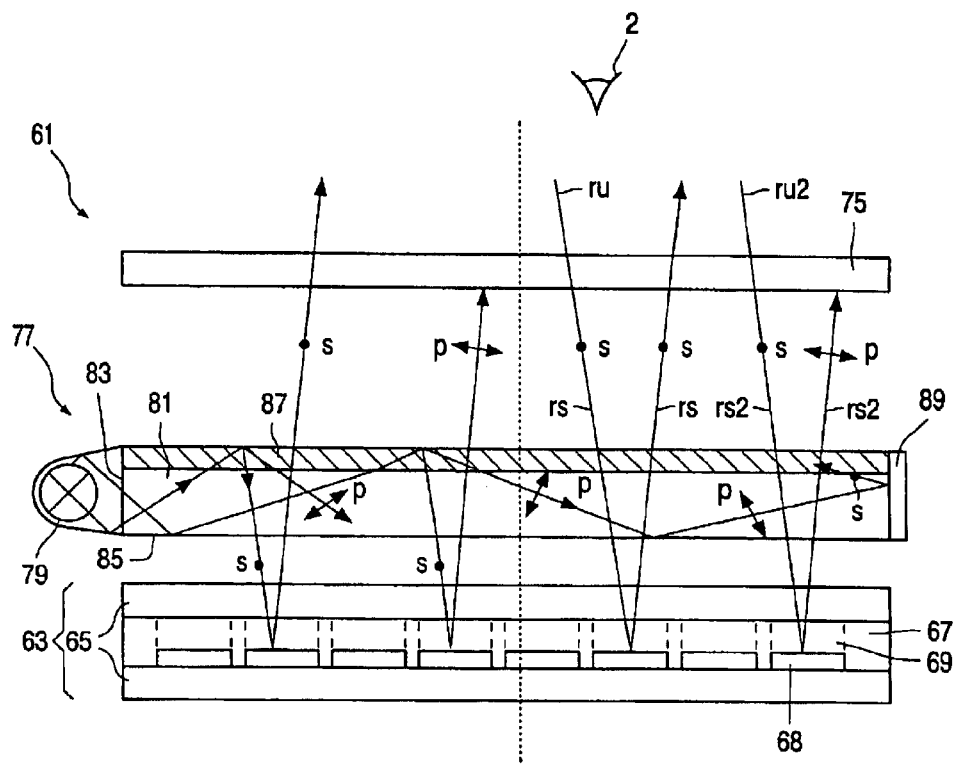

FIG. 17 shows schematically in a cross-sectional view, yet another waveguide and front illumination arrangement and display device in accordance with the invention.

The reflective display device 61 has a display cell 63 comprising glass substrates 65 between which an LC layer 67 is disposed. In the LC layer 67, pixels 69 are defined using an reflective Al electrodes 68. With a pixel 69 in the addressed state, the polarization of light transmitted by the cell is not changed. With a pixel 67 in the non-addressed state, the polarization is changed by 90° or an odd multiple thereof. The display device 61 has a single linear absorbing polarizer 75 arranged between the cell 63 and the viewer 2. A front light edge-lit arrangement 77 is arranged between polarizer 75 and display cell 63. The front light 77 has a light source 79 arranged near the entry side face 83 of a waveguide 81 which further has an exit surface 85 and polarization-selective outcoupling means at least including a volume hologram 87 and, optionally, light absorbing and/or light recycling means 89 both of a type described hereinabove. In operation using ambient light, an ambient light ray ru is polarized to a polarized, say s-polarized, light ray rs which passes the waveguide 81 undisturbed. Incident on a pixel 69 in the addressed state, the light ray rs is transmitted by the LC layer 67, reflects off the electrode 68 and passes the LC layer 67 again, all without changing polarization. Since the polarization has not changed when the ray rs reaches the polarizer 75 again, it is transmitted by the polarizer 75. On the other hand, when an s-polarized ray rs2 is incident on a non-addressed pixel, the polarization is changed thus forming the light ray rp2, the light ray rp2 then being absorbed by the polarizer 75. With the front light 77 switched on, the s-polarized component of light from light source 79 is polarization-selectively diffracted towards the display cell 63 by volume hologram 87.

Figure 18:
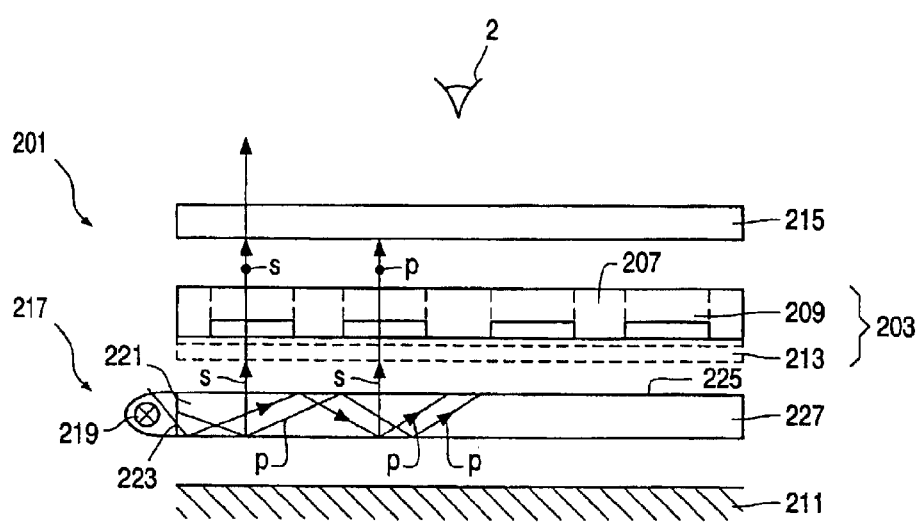

FIG. 18 shows, schematically, in a cross-sectional view, a waveguide and back light illumination arrangement and display device in accordance with the invention.

The display device 201 is a transflective device comprising a display cell 203 having an LC layer 207 and pixels 209. Arranged between the viewer 2 and the display cell 203 a linear absorbing polarizer 215 is provided. A back light arrangement 217 illuminates the display cell 203 from the back when ambient conditions are poor. The arrangement 217 comprises a light source 217 arranged near the entrance side face 223 of a waveguide 221 having exit surface 225 and polarization-selective outcoupling means including at least a volume hologram 227. In order to reflect ambient light, or stray light from the light source 219 a reflector 211 is arranged behind the back light 217. Optionally, to further increase the contrast of light emitted by the waveguide 221 a clean-up polarizer 213 may be arranged between the waveguide 221 and the display cell 203.

What is claimed is:

1. A waveguide comprising
   an entry side face for coupling light into the waveguide,
   an exit surface for emission of light from the waveguide, and
   polarization-selective light outcoupling means for coupling out waveguided light through the exit surface polarization selectively,
   the polarization-selective outcoupling means comprising a volume hologram configured to selectively diffract waveguided light towards the exit surface with a nolarization contrast of at least a factor of five over an annular range of at least five degrees.

2. A waveguide as claimed in claim 1, wherein
   the volume hologram is a volume holographic Bragg-grating.

3. A waveguide comprising
   an entry side face for coupling linht into the waveguide,
   an exit surface for emission of light from the waveguide, and
   polarization-selective light outcoupling means for coupling out waveguided light through the exit surface polarization selectively,
   the polarization-selective outcoupling means comprising a volume hologram configured to selectively diffract waveguided light towards the exit surface,
   wherein
      the polarization selective outcoupling means include a volume hologram configured to diffract waveguided light at a Bragg-angle of about 45°.

4. A waveguide as claimed in claim 1, wherein
   the volume hologram comprises a volume holographic layer having a thickness d and a refractive index modulation $\Delta n$, and
   the product $d\Delta n$ is selected such that waveguided light of a first polarization is diffracted more efficiently than waveguided light of a second polarization, to provide the polarization contrast.

5. A waveguide comprising
   an entry side face for coupling light into the waveguide,
   an exit surface for emission of light from the waveguide, and
   polarization-selective light outcoupling means for coupling out waveauided light through the exit surface polarization selectively,
   the polarization-selective outcoupling means comprising a volume hologram configured to sclectively diffract waveauided light towards the exit surface,
   wherein
      the polarization-selective light outcoupling means comprises, disposed between the volume hologram and the entry side face,
         a polarization-selective beam splitting interface or layer for splitting waveguided light into light of a first polarization and light of a second polarization,
         at least the light of the first polarization being directed towards the volume hologram which is configured to selectively diffract the light of the first polarization.

6. A waveguide as claimed in claim 5, comprising
   an entry member and
   an exit member,
   the entry member comprising rue entry side face and
   the exit member comprising the volume hologram,
   the exit member and the entry member having a common interface forming the polarization-selective beam-splitting interface, and
   at least the entry or the exit member being optically anisotropic having refractive indices selected such that
   $n_{entry,1}/n_{exit,1} < n_{entry,2}/n_{exit,2}$ where
- $n_{entry,1}$ is a refractive index of the entry member experienced by waveguided light of a first polarization,
- $n_{entry,2}$ is a refractive index of the entry member experienced by waveguided light of a second polarization,
- $n_{exit,1}$ is a refractive index of the exit member experienced by waveguided light of a first polarization,
- $n_{exit,2}$ is a refractive index of the exit meinber experienced by waveguided light of a second polarization,
- light of the first polarization is refracted in angular range $\theta_{1,min} = <\theta_r < \theta_{1,max}$, and light of the second polarization is refracted in angular range $\theta_{2,min} < \theta_r = <_{2,max}$, and wherein
  the volume hologram is configured to selectively diffract waveguided either light of the first polarization in the range $\theta_{1,min} = <\theta_r < \theta_{2,min}$ or light of the second polarization in the range $\theta_{1,max} < \theta_r = <\theta_{2,max}$.

7. A waveguide as claimed in claim 5, comprising
an entry member and
an exit member,
the entry member comprising the entry side face and the exit member comprising the volume hologram,
the exit member and the entry member having a common interface forming the polarization-selective beam-splitting interface, and
at least the entry or the exit member being optically anisotropic having refractive indices selected such that wavegiiided light of a first polarization incident from the entry member on the interface is at least partially transmitted into the exit member and
waveguided light of a second polarization incident from the entry member on the interface is, at least partially, totally internally reflected, and
the volume hologram is configured for diffracting the waveguided light transmitted into the exit member.

8. A waveguide as claimed in claim 1, wherein
the polarization selective outcoupling means include a volume hologram formed from an optically anisotropic material having
a first refractive index modulation experienced by light of a first polarization and
a second refractive index modulation experienced by light of a second polarization,
the first and the second refractive index modulation being different.

9. A waveguide as claimed in claim 5 comprising
a combination of a volume hologram and an exit member integrally formed from optically anisotropic material and/or
a combination of a volume hologram and a polarization-selective beam splitting layer integrally formed from optically anisotropic material.

10. A waveguide comprising
an entry side face for coupling light into the waveguide,
an exit surface for emission of light from the waveguide,
a back surface opposite the exit surface, and
a volume hologram configured to selectively couple out light to one side of the waveguide,
the one side being the exit surface side of the waveguide, and
the waveguide having a forward-to-backward contrast of at least ten at at least one emission angle.

11. A waveguide comprisina
an entry side face for coupling light into the waveguide,
an exit surface for emission of light from the waveguide,
a back surface onoosite the exit surface, and
a volume hologram configured to selectively connie out light to one side of the waveguide,
the one side being the exit surface side of the waveguide
wherein
  the waveguide has an end face opposite the entry side face which end face is provided with means for reducing the amount of light reflected back into the waveguide.

12. An edge-lit illumination arrangement comprising
a waveguide as claimed in claim 1 and
a light source arranged near the entry side face thereof.

13. A reflective or transflective display device having
a front light arrangement cornpnsing an iilumination arrangement as claimed in claim 12.

14. A reflective display device as claimed in claim 13, comprising
a display cell and polarizer arranged on a viewing side of the display cell
wherein
  the front light arrangement is disposed between the polarizer and the display cell.

15. A mobile phone provided with
an illumination arrangement as claimed in claim 12.

16. A waveguide as claimed in claim 3, wherein
the volume hologram comprises a volume holographic layer having a thickness d and a refractive index modulation $\Delta n$, and
the product $d\Delta n$ is selected such that waveguided light of a first polarization is diffracted more efficiently than waveguided light of a second polarization,
the diffraction efficiency of the first polarization being at least five times the diffraction efficicucy of the second polarization.

17. A waveguide as claimed in claim 3, wherein
the polarization-selective light outcoupling means comprises, disposed betwecn the volume hologram and the entry side face,
a polarization-selective beam splitting interface or layer for splitting waveguidcd light into light of a first polarization and light of a second polarization,
at least the light of the first polarization being directed towards the volume hologram which is configured to selectively diffract the light of the first polarization.

18. A waveguide as claimed in claim 3, wherein
the polarization selective outcoupling means include a volume hologram formed from an optically anisotropic material having
a first refractive index modulation cxperienced by light of a first polarization and
a second refractive index modulation experienced by light of a second polarization,
the first and the second refractive index modulation being different.

19. A waveguide as claimed in claim 18, comprising at least one of:
a combination of a volume hologram and an exit member integrally formed from optically anisotropic material, and
a combination of a volume hologram and a polarization-selective beam splitting layer integrally formed from optically anisotropic material.

20. A waveguide as claimed in claim 5, wherein
the polarization selective outcouplirig means include a volume hologram formed from an optically anisotropic material having
a first refractive index modulation experienced by light of a first polarization and
a second refractive index modulation experienced by light of a second polarization,
the first and the second refractive index modulation being different.

21. A waveguide as claimed in claim 11, wherein
the means for reducing the amount of light reflected back into the waveguide includes at least one of:
an anti-reflecting layer, and
a light-absorbing coating.

22. An edge-lit illumination arrangement comprising
a waveguide as claimed in claim 3 and
a light source arranged near the entry side face thereof.

23. A reflective or transflective display device having
a front light arrangement comprising an illumination arrangement as claimed in claim 22.

24. A reflective display device as claimed in claim 23, comprising
a display cell and polarizer arranged on a viewing side of the display cell
wherein
the front light arrangement is disposed between the polarizer and the display cell.

25. A mobile phone provided with
an illumination arrangement as claimed in claim 22.

26. An edge-lit illumination arrangement comprising
a waveguide as claimed in claim 5 and
a light source arranged near the entry side face thereof.

27. A reflective or transflective display device having
a front light arrangement comprising an illumination arrangement as claimed in claim 26.

28. A reflective display device as claimed in claim 27, comprising
a display cell and polarizer arranged on a viewing side of the display cell
wherein
the front light arrangement is disposed between the polarizer and the display cell.

29. A mobile phone provided with
an illumination arrangement as claimed in claim 26.

* * * * *